United States Patent [19]
Ikeda et al.

[11] Patent Number: 4,662,649
[45] Date of Patent: May 5, 1987

[54] KNEE PROJECTOR IN AUTOMOBILE

[75] Inventors: Hidekazu Ikeda, Hiroshima; Masayoshi Ono, Kure, both of Japan

[73] Assignee: Mazda Motor Corporation, Hiroshima, Japan

[21] Appl. No.: 835,945

[22] Filed: Mar. 4, 1986

[30] Foreign Application Priority Data

Mar. 12, 1985 [JP] Japan .................................. 60-48784

[51] Int. Cl.$^4$ ............................................. B60R 21/02
[52] U.S. Cl. ..................................... 280/752; 180/90; 296/70
[58] Field of Search ...................... 280/751, 752, 804; 180/90; 296/70

[56] References Cited

U.S. PATENT DOCUMENTS

| | | | |
|---|---|---|---|
| 3,774,713 | 11/1973 | Stegmaier | 280/752 |
| 3,938,821 | 2/1976 | Haas et al. | 280/751 |
| 4,032,175 | 6/1977 | Aibe et al. | 280/751 |
| 4,105,223 | 8/1978 | Oda et al. | 280/751 |
| 4,317,582 | 3/1982 | Cottin et al. | 280/751 |
| 4,421,343 | 12/1983 | Yoshitsugu et al. | 280/752 |
| 4,474,391 | 10/1984 | Matsuno et al. | 280/752 |
| 4,518,172 | 5/1985 | Bortz et al. | 280/752 |

FOREIGN PATENT DOCUMENTS 59-23454  2/1984  Japan .

Primary Examiner—Richard A. Bertsch
Attorney, Agent, or Firm—Burns, Doane, Swecker & Mathis

[57] ABSTRACT

A knee protector in an automobile which comprises an instrument panel arranged in front of a seat within a passenger compartment of the automobile and exiting widthwise of the automobile, and having an opening defined therein, a lid similar in shape to the contour of the opening and supported by the instrument for selectively closing and opening the opening in the instrument panel, a first protector member provided inside the lid, a pair of pin members spaced a distance from each other in a direction widthwise of the automobile and secured to the first protector member so as to protrude in a direction close towards the instrument panel, and a second protector member provided inside the instrument panel and having separate engagement regions defined therein for engagement with the respective pin members when a load acting in a direction frontwardly of the automobile acts on the lid.

11 Claims, 4 Drawing Figures

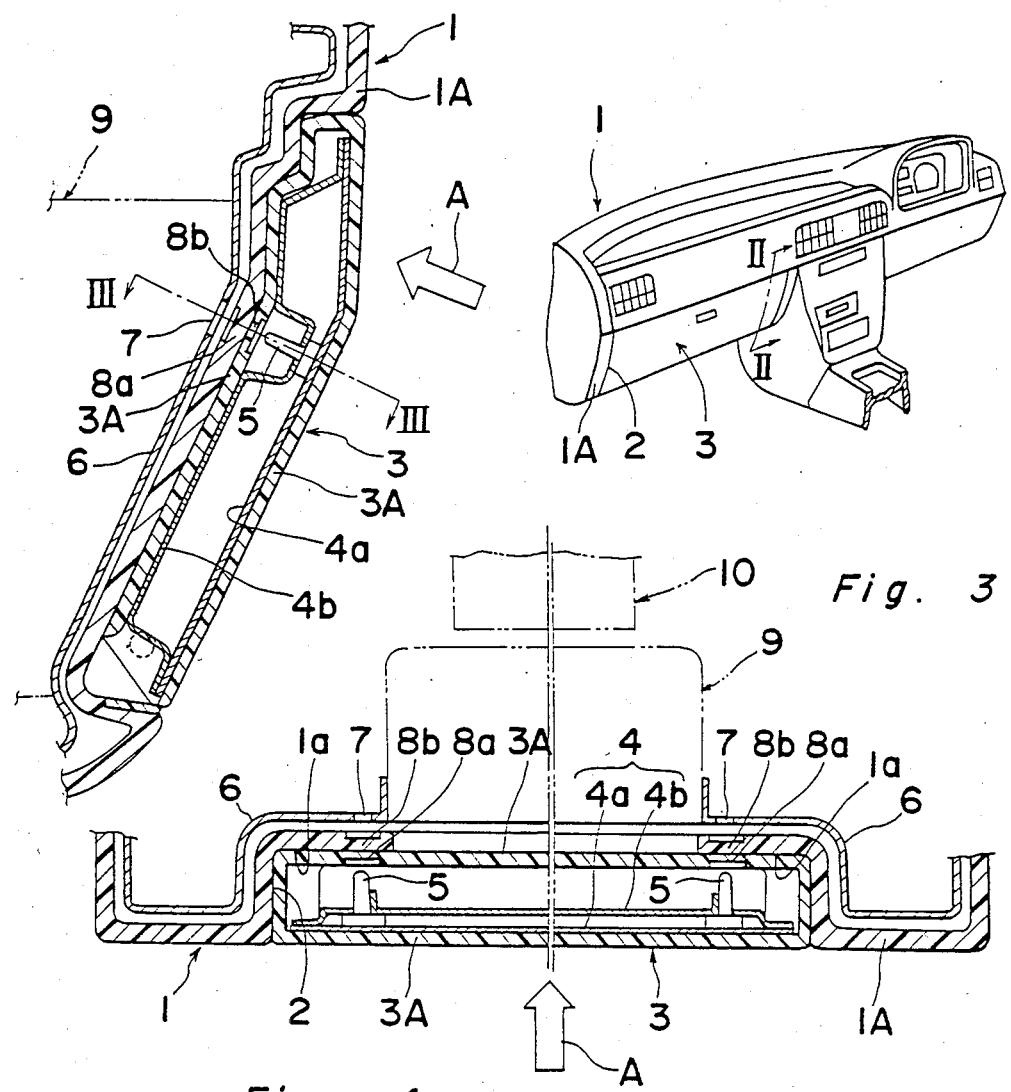

KNEE PROJECTOR IN AUTOMOBILE

BACKGROUND OF THE INVENTION

The present invention generally relates to a vehicle safety device and, more particularly, to a knee protector installed in an automobile in front of a seat for protecting the knees of a seat occupant in the event of an automobile collision.

Hitherto, numerous types of knee protectors have been devised, some of which are currently employed in practice. These are disclosed in, for example, U.S. Pat. No. 3,931,988, patented Jan. 13, 1976 to Oehm et al., U.S. Pat. No. 3,979,139, patented Sept. 7, 1976 to Hoffmann et al., U.S. Pat. No. 4,032,175, patented June 28, 1977 to Aibe et al., and U.S. Pat. No. 4,061,365, patented Dec. 6, 1977 to Nagano et al.; and Japanese Laid-open Utility Model Publication No. 59-23454, published Feb. 14, 1984.

In all of these listed prior art references, the knee protector generally comprises a relatively rigid transverse support member extending widthwise of the automobile compartment underneath the instrument panel, and an energy-absorbing cushioning pad lined to the transverse support member so as to confront with the knees of a seat occupant.

Except for the last-mentioned reference, all of the patents have failed to take the presence of a glove compartment, or a glove box, into consideration in devising the subject knee protector. Obviously, where the glove box is defined in the instrument panel at a location laterally of and next to the gauge area where numerous gauges and meters are clustered, and the knee protector is designed for installation under the instrument panel, the presence of the glove box need not be considered in devising the knee protector.

The last-mentioned reference, i.e., Japanese Laid-open Utility Model Publication No. 59-23454, discloses the knee protector installed underneath the instrument panel and having a glove box defined therein on one side remote from the steering column. The knee protector disclosed therein comprises an elongated, double-layered transverse member comprised of outer and inner panels joined together so as to have a generally closed-sectioned hollow therebetween and a cushioning pad lined to one surface of the outer panel facing the passenger's compartment. The transverse member is perforated in one of the halves of the knee protector remote from the steering column for accommodating a glove box for pivotal movement between closed and opened positions, the axis of pivot of the glove box lying in a direction widthwise of the automobile.

The glove box disclosed in publication No. 59-23454 comprises a double-layered lid comprised of inner and outer lid panels joined together to have a closed-sectioned hollow defined therebetween, a cushioning pad lined to one surface of the outer lid panel facing the passenger's compartment, and a generally U-sectioned, open-topped container secured to the inner lid panel. While the container, when the lid is pivoted to the opened position accompanied by the corresponding angular movement of the container, opens diagonally upwardly for the access to the seat occupant, the container is concealed behind the lid when the latter is in the closed position.

The lid for the glove box disclosed in publication No. 59-23454 may be considered a double of the knee protector, albeit the difference in dimension, and, therefore, the lid itself could serve as a knee protector for the seat occupant next to the driver. The lid as the knee protector is so designed that, in the event that the knees impinge upon the lid applying a relatively great impact force to the lid, the outer lid panel is deformed or buckled inwardly of the hollow in the lid while absorbing the applied impact energy. However, should the impact force transmitted from the knees to the lid be greater in the event of an automobile collision, there is a possibility that the hollow in the lid would no longer accommodate the buckling of the outer lid panel, permitting the inner lid panel to be buckled in contact with the outer lid panel being buckled. Once the outer lid panel is severely buckled inwardly accompanied by the corresponding buckling of the inner lid panel in a direction forwardly with respect to the position of the seat occupant, the container could be pushed further in a direction away from the lid, giving damage to an automobile air-conditioner unit where the latter is installed behind the glove box. This may in turn result in the transmission of a counteracting impact force back to the knees of the seat occupant who would suffer from serious injury which ought to have been slight or negligible.

SUMMARY OF THE INVENTION

The present invention has been devised with a view to substantially eliminating the above described problems inherent in the prior art knee protector of a type having a glove box and has for its essential object to provide an improved knee protector wherein the lid is so constructed as to distribute the applied impact force in a direction laterally outwardly to minimize the excessive inward buckling of the lid.

Another object of the present invention is to provide an improved knee protector of the type referred to above which is, even though the lid is inwardly buckled, effective to avoid any possible collision of a glove compartment defining structure against the automobile air-conditioner unit, thereby to minimize the transmission of the counteracting impact force back to the knees of the seat occupant.

In order to accomplish the above objects, the lid for selectively opening and closing the glove compartment defined in a lower region of the instrument panel has its interior provided with a generally double-walled first protector member generally elongated in a direction widthwise of the automobile compartment, and a pair of spaced pin members fitted to the first protector member at opposite end portions thereof and spaced a distance from each other in a direction widthwise of the automobile compartment so as to protrude towards the lower region of the instrument panel.

Within the interior of the instrument panel, there is arranged a second protector member having separate engagement means defined in alignment with the pin members in the first protector member so that, when a load acting in a direction frontwardly of the automobile acts on the lid, the pin members can be engaged with the engagement means, respectively.

Accordingly, in the event that the knees of the seat occupant sitting in front of the glove compartment lid collide against the glove compartment lid, the first protector is inwardly, or frontwardly with respect to the position of the seat occupant, deformed to absorb the applied impact energy and, at the same time, the pin members rigid with the first protector member being so deformed engage the engagement means in a direction generally outwardly slantwise with respect to each other whereby the load imposed on the lid can be distributed in a direction laterally of the lid thereby restraining any possible further deformation of both the first and second protector members.

BRIEF DESCRIPTION OF THE DRAWINGS

These and other objects and features of the present invention will become clear from the following description taken in conjunction with a preferred embodiment thereof with reference to the accompanying drawings, in which:

FIG. 1 is a perspective view showing an automobile instrument panel;

FIG. 2 is a cross-sectional view, on an enlarged scale, taken along the line II—II in FIG. 1;

FIG. 3 is a cross-sectional view taken along the line III—III in FIG. 2; and

FIG. 4 is a view similar to FIG. 3, showing a glove compartment lid having been deformed by the application of an impact force thereto.

DETAILED DESCRIPTION OF THE EMBODIMENT

As shown in FIG. 1, an automobile has an instrument panel 1 positioned below the front windshield and generally facing towards the passenger compartment. As viewed from a seat occupant facing towards the front windshield as well as the instrument panel 1, one of the opposite side portions of the instrument panel 1 remote from a conventional steering column (not shown) has a generally rectangular opening 2 defined therein with its longitudinal sense lying widthwise of the automobile. This opening 2 leads into the interior of a glove box, shown by the phantom lines in FIGS. 2 and 3 as will be mentioned later, and is adapted to be selectively closed and opened generally identified by 3.

As best shown in FIGS. 2 and 3, the lid 3 has a surfacing layer 3A, made of a soft synthetic material, and is hinged at its lower side to the instrument panel 1 for selectively closing and opening the opening 2. An inner surface of the surfacing layer 3A is provided with a first protector 4 similar in shape to the contour of the opening 2 and comprised of an outer lid panel 4a and an inner lid panel 4b both joined together to define a closed hollow therebetween. The first protector 4 is fitted with a pair of pin members 5 spaced a distance from each other in a direction lengthwise of the lid 3, i.e., widthwise of the passenger compartment.

One surface of the instrument panel 1 facing the passenger compartment is lined with a surfacing layer 1A of soft synthetic material which may be identical with the material for the lid surfacing layer 3A, and a lip region thereof confronting the opening 2 is inwardly indented at 1a at respective locations adjacent the opposite ends of the opening 2 to provide a space for accommodating the lid 3 in the closed position.

Within the instrument panel 1, there is provided a second protector 6 having an aperture defined therein in a size somewhat smaller than the opening 2, which aperture is communicated with the glove box 9 rigidly secured to the second protector 6 so as to open towards the opening 2. A peripheral lip region of the second protector 6 around the aperture defined in the latter has a pair of engagement means 7 defined in alignment with, and spaced widthwisely from each other a distance equal to the distance between, the respective pin members 5 in the first protector 4 for engagement with the pin members 5. In the illustrated embodiment, each of the engagement means 7 is employed in the form of a through-hole defined in the second protector 6 for receiving therein the respective pin member 5 in the event of an inward deformation of the lid 3 in the closed position as will be described later with particular reference to FIG. 4.

Portions of the surfacing layer 3A of the lid 3 and portions of the surfacing layer 1A of the instrument panel 1 both situated in register with the pin members 5 as well as the engagement means or through-holes 7 are thin-walled at 8a and 8b, respectively, to permit the pin members 5 to readily pierce therethrough into the associated through-holes 7 upon the inward deformation of the lid 3.

Shown by the phantom line 10 in FIG. 3 as positioned behind the glove box 9 with respect to the position of the seat occupant is an automobile air-conditioner unit, for example, an evaporator and its associated shroud.

In the construction as hereinbefore described, and assuming that the knees of the seat occupant collide against the lid 3 in a direction shown by the arrow A in the event of, for example, an automobile collision, the outer lid panel 4a of the first protector 4 of closed cross-section is deformed inwardly of the hollow in the first protector 4, followed by a corresponding inward deformation of the outer lid panel 4b. In this way, the impact energy generated upon the collision of the knees against the lid 3 can be absorbed by the plastic deformation of the lid 3 as a whole.

However, when the greater force is applied at the time of the collision, accompanied by the correspondingly greater deformation of the lid 3 as a whole as shown in FIG. 4, the pin members 5 rigid with the first protector 4 pierce through the thin-walled portions 8a and 8b of the respective surfacing layers 3A and 1A into the through-holes 7 in the second protector 6. While the span between the through-holes 7 in the second protector 6, or more precisely, the straight distance between the axes $C_2$ passing through the respective centers of the through-holes 7 at right angles to the second protector 6, remains constant regardless of the plastic deformation of the lid 3, the straight distance between the longitudinal axes $C_1$ of the respective pin members 5 perpendicular to the first protector 4 changes as the plastic deformation of the first protector progresses, deviating from the value equal to the straight distance between the axes $C_2$ passing through the centers of the through-holes 7 as clearly shown in FIG. 4. Therefore, when the pin members 5 pierce through the thin-walled portions 8a and 8b into the through-holes 7, they are engaged in the through-holes 7 in a direction outwardly slantwise with respect to each other, with the first protector 4 tending to be generally stretched in a direction outwardly with respectively to the longitudinal sense of the lid 3.

Thus, according to the present invention, the impact energy generated upon the collision of the knees against the lid 3 is first lessened by the plastic deformation of the first protector 4 for a moment immediately after the collision of the knees and is then distributed over the second protector 6 in a direction generally widthwise of the automobile by the slantwise engagement of the pin members 5 into the through-holes 7. In this way, the first protector 4 as well as the second protector 6 are refrained from being excessively deformed or buckled in a direction forwardly with respect to the position of the seat occupant, thereby substantially eliminating or minimizing the possibility of the glove box 9 striking against the air-conditioner unit 10 positioned therebehind. At the same time, the knees of the seat occupant can be effectively protected.

Although the present invention has been fully described in connection with the preferred embodiment thereof with reference to the accompanying drawings, it is to be noted that various changes and modifications are apparent to those skilled in the art. By way of example, although the portions 8a and 8b of the respective surfacing layers 3A and 1A have been described as thin-walled in the illustrated embodiment, they may be perforated. However, the use of the thin-walled portions 8a and 8b are advantageous in that the through-holes 7 and the pin members 5 can be concealed from the sight of the seat occupant, permitting the glove compartment arrangement to be comfortable to look at. Each of the thin-walled areas 8a and 8b can be simply formed by recessing that portion of the respective surface layer 3A or 1A.

And, each of the outer and inner lid panels 4a and 4b and the second protector 6 is preferably made of a metal plate, for example, a steel plate, although it is not limited thereto and a comparable compound material may be employed therefor.

Accordingly, such changes and modifications are to be understood as included within the scope of the present invention as defined by the appended claims, unless they depart therefrom.

What is claimed is:

1. A knee protector in an automobile which comprises:
    an instrument panel arranged in front of a seat within a passenger compartment of the automobile and extending widthwise of the automobile, said instrument panel having an opening defined therein;
    a lid similar in shape to the contour of the opening and supported by said instrument panel for movement between a first position closing the opening in said instrument panel and a second position exposing, the opening in said instrument panel;
    a first protector member provided in and movable with said lid;
    a pair of pin members spaced a distance from each other in said widthwise direction of the automobile and secured to said first protector member so as to protrude in a direction perpendicular to said first protector member generally toward said instrument panel when said lid is in said first position; and
    a second protector member provided inside said instrument panel frontwardly of said pin members with respect to the automobile and having defined therein separate engagement means in alignment with each of said pin members when said lid is in said first position, said separate engagement means engaging the respective pin members when a load acting in a direction generally frontwardly of the automobile acts on the lid when said lid is in said first position such that the load is transmitted to the second protector member through said pin members and said engagement means.

2. The protector as claimed in claim 1, wherein a peripheral lip region of said instrument panel is inwardly indented at locations adjacent widthwisely opposite portions of the opening, respectively, to provide shoulders which contact said lid when in said first position.

3. The protector as claimed in claim 2, wherein said pin members are aligned with the respective engagement means with the shoulders interposed therebetween when said lid is in said first position.

4. The protector as claimed in claim 1, wherein each of the engagement means includes a through-hole positioned in alignment with the respective pin member when said lid is in said closed position and is located frontwardly of said pin members with respect to the automobile.

5. The protector as claimed in claim 4, wherein second protector member is made of a steel plate.

6. The protector as claimed in claim 1, wherein said first protector member includes outer and inner lid panels joined together with a closed hollow defined therebetween.

7. The protector as claimed in claim 6, wherein each of said outer and inner lid panels is made of a steel plate.

8. The protector as claimed in claim 1, further comprising a surfacing layer of soft material lined to each of said instrument panel and said lid.

9. The protector as claimed in claim 8, wherein said surfacing layer lined to each of said instrument panel and said lid has pierceable portions defined therein in register with the respective pin members when said lid is in said first portion, said pierceable portions being adapted to be punctured by the respective pin members when the load is applied to said lid.

10. The protector as claimed in claim 9, wherein each of said pierceable portions is constituted by a thin-walled portion of the respective surfacing layer.

11. The protector as claimed in claim 10, wherein each of said thin-walled portions of said surfacing layer lined to the instrument panel is formed by recessing said surfacing layer inwardly in a direction towards said lid, whereas each of the thin-walled portions of said surfacing layer lined to said lid is formed by recessing said surfacing layer inwardly in a direction towards said engagement means.

* * * * *